United States Patent
Everitt et al.

(10) Patent No.: US 7,446,780 B1
(45) Date of Patent: Nov. 4, 2008

(54) TEMPORAL ANTIALIASING IN A MULTISAMPLING GRAPHICS PIPELINE

(75) Inventors: Cass W. Everitt, Round Rock, TX (US); Rui M. Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 522 days.

(21) Appl. No.: 10/912,857

(22) Filed: Aug. 4, 2004

Related U.S. Application Data

(60) Provisional application No. 60/499,052, filed on Aug. 29, 2003.

(51) Int. Cl.
*G09G 5/00* (2006.01)
(52) U.S. Cl. ............................. 345/611; 345/473
(58) Field of Classification Search ............... None
See application file for complete search history.

(56) References Cited

U.S. PATENT DOCUMENTS

| | | | | |
|---|---|---|---|---|
| 6,448,970 | B1 * | 9/2002 | Kajioka et al. ............ | 345/473 |
| 6,501,483 | B1 * | 12/2002 | Wong et al. ............... | 345/611 |
| 6,525,725 | B1 * | 2/2003 | Deering .................... | 345/419 |
| 6,654,020 | B2 * | 11/2003 | Mori ........................ | 345/475 |
| 6,919,895 | B1 * | 7/2005 | Solanki et al. ............ | 345/503 |

OTHER PUBLICATIONS

Haeberli, Paul et al. "The Accumulation Buffer: Hardware Support for High-Quality Rendering" Computer Graphics, vol. 24, No. 4, Silicon Graphics Computer Systems Aug. 1990.
Salvator, Dave "ExtremeTech 3D Pipeline Tutorial" Jun. 13, 2001.

* cited by examiner

*Primary Examiner*—Kee M. Tung
*Assistant Examiner*—Kevin K Xu
(74) *Attorney, Agent, or Firm*—Townsend and Townsend and Crew, LLP

(57) ABSTRACT

Multisampling techniques provide temporal as well as spatial antialiasing. Coverage for a primitive is be determined at multiple sample locations for a pixel. In one embodiment, coverage is determined using boundary equations representing a boundary surface of the primitive in a three-dimensional space-time. A shading value for the primitive is computed for the pixel and stored for each coverage sample location of the pixel that is covered by the primitive. The sample locations are distributed in both space and time, and multiple sample locations share a single shading computation. The multisampling techniques are extendable to other dimensions that correspond to other image attributes.

23 Claims, 8 Drawing Sheets

TEMPORAL ANTIALIASING IN A MULTISAMPLING GRAPHICS PIPELINE

CROSS-REFERENCES TO RELATED APPLICATIONS

This application claims the benefit of U.S. Provisional Application No. 60/499,052, filed Aug. 29, 2003, entitled "Temporal Antialiasing in a Multisampling Graphics Pipeline," the disclosure of which is incorporated herein by reference for all purposes.

The present disclosure is related to commonly-assigned co-pending U.S. patent application Ser. No. 10/658,056, filed Sep. 8, 2003, entitled "Antialiasing Using Hybrid Supersampling-Multisampling," which disclosure is incorporated herein by reference for all purposes.

BACKGROUND OF THE INVENTION

The present invention relates in general to temporal antialiasing techniques for computer graphics systems, and in particular to multisampling techniques for temporal antialiasing.

Display devices, such as monitor screens, produce images using an array of small-size picture elements ("pixels"), each having a solid color. The color of each pixel is independently controllable so that an arbitrary image can be produced on the display device. In many instances, pixel color is determined using a graphics processing system that receives image data to be rendered from an application program. The image data generally includes position, size, and color information for a number of simple polygons (e.g., triangles) referred to as "primitives," of which the image is composed. The graphics processing system rasterizes the image data by sampling the primitives at a number of predetermined sample locations (e.g., a point corresponding to the center of each pixel), thereby generating a shading value (also referred to as a "color value") for each pixel. These shading values are stored in a frame buffer that is periodically scanned out to a display device, thereby producing a viewable image.

In general, the shading value for a pixel is determined according to the color of a primitive that covers the pixel. Shading values can be determined using numerous well-known techniques, such as constant shading, interpolation between shading values associated with each vertex, Gouraud shading, and Phong shading.

Many existing systems determine color and coverage for a pixel based on the location of the primitives at a particular instant. In animation, this results in rasterized images at a sequence of instants separated by a finite frame interval. The result appears unlike a conventional motion picture in two respects. First, in each image, the moving object is in clear focus, not blurred by its motion as it would be if filmed by a camera that exposes each frame of film for a finite time. Second, the motion of the object occurs in discrete jumps, making the motion appear jerky rather than smooth. Such undesirable artifacts, generally referred to as temporal aliasing, lead to loss of realism in computer-generated animation.

Some existing systems attempt to reduce temporal aliasing by adapting supersampling techniques that have been used to reduce spatial aliasing effects (such as jagged edges) by introducing blurriness or fuzziness into computer-generated images. Supersampling for spatial antialiasing involves independently generating a number of shading samples at different sampling locations within a pixel, then blending the shading samples to produce a final color for the pixel. Temporal supersampling involves generating a shading sample for a pixel at each of a number of different intermediate times within a frame interval, then blending the sample values. Because the positions of moving objects shift relative to the pixel, each intermediate-time sample will generally have a different color value. Blending these values introduces a realistic "motion blur" effect. Such techniques have been used in software-based rendering systems, such as Pixar's RenderMan software.

However, using supersampling for both spatial and temporal antialiasing requires a large number of color computations per pixel. Computing color is computationally intensive, and repeating such computations numerous times per pixel is impractical in existing real-time hardware-based rendering systems, which typically need to generate a large number of image frames per second for applications such as video games.

It would therefore be desirable to provide temporal antialiasing techniques that are less computationally intensive than supersampling.

BRIEF SUMMARY OF THE INVENTION

Embodiments of the present invention relate to the use of multisampling techniques to provide temporal as well as spatial antialiasing. Multisampling techniques allow coverage and depth for a primitive to be determined at multiple sample locations for each pixel, while shading is computed once per pixel. The shading value is stored for each coverage/depth sample location that is covered by the primitive. In accordance with an embodiment of the present invention, coverage for a pixel is determined at multiple sample locations that are distributed over a time interval as well as a spatial area of the pixel, and multiple sample locations share a single shading computation. Thus, temporal and spatial antialiasing can be provided without requiring that shading be computed at a large number of sample locations.

According to one aspect of the invention, a method is provided for generating multisampled pixel in a multi-dimensional space. Geometry data representing a primitive in the multi-dimensional space is received, and a set of boundary equations is generated from the geometry data. The boundary equations represent boundary surfaces of the primitive in the multi-dimensional space. A number of coverage sample points are selected within a pixel volume in the multi-dimensional space. A shading value for the pixel is computed. For each of the coverage sample points, it is determined from the set of boundary equations whether the coverage sample point is inside the primitive. If the coverage sample point is inside the primitive, the shading value is stored for the coverage sample point. A final pixel color may be determined by blending the stored shading values for each sample point of the pixel.

According to another aspect of the invention, a method is provided for generating an image. Geometry data representing a location and a motion of a primitive during a frame interval is received. Within a graphics processing pipeline, a number of intermediate primitives are generated from the geometry data. Each intermediate primitive is associated with a respective intermediate time within the frame interval. Each of the intermediate primitives is multisampled, thereby generating a plurality of multisampled data sets for a pixel. These multisampled data sets are filtered to determine a color value for the pixel.

According to a further aspect of the invention, a system for generating a color value for a pixel from geometry data includes a rasterizer, a memory, and a shader. The rasterizer is configured to generate a shading value for the pixel from the geometry data and to determine coverage for each of a number of sample locations for the pixel in a multi-dimensional space having at least three dimensions. The memory is configured to store the shading value in association with each of the sample locations that is determined to be covered. The shader is configured to combine the stored shading values, thereby computing the color value for the pixel.

According to yet another aspect of the invention, a system for generating a color value for a pixel from geometry data includes a geometry unit, a rasterizer, and a shader. The geometry unit is configured to generate a number of intermediate primitives corresponding to a primitive of the geometry data, with each intermediate primitive corresponding to a respective intermediate time within a frame interval. The rasterizer is configured to perform a multisampling operation for each intermediate primitive. Each multisampling operation generates a shading value for the pixel and associates the shading value with a number of coverage sample locations for the pixel. The shader is configured to combine the shading values associated with the coverage sample locations for the pixel, thereby computing the color value for the pixel.

The following detailed description together with the accompanying drawings will provide a better understanding of the nature and advantages of the present invention.

DETAILED DESCRIPTION OF THE INVENTION

Embodiments of the present invention relate to the use of multisampling techniques to provide temporal as well as spatial antialiasing. In multisampling, coverage and depth for a primitive are determined at multiple sample locations for each pixel, but shading is computed once per pixel. The shading value is stored for each coverage/depth sample location that is covered by the primitive. In accordance with an embodiment of the present invention, coverage and depth are determined at different times, as well as at different spatial coordinates, and multiple sample locations (in space-time) share a single shading computation. Thus, temporal and spatial antialiasing can be provided without requiring that shading be computed at a large number of sample locations.

I. COMPUTER SYSTEM EMBODIMENT

Figure 1:
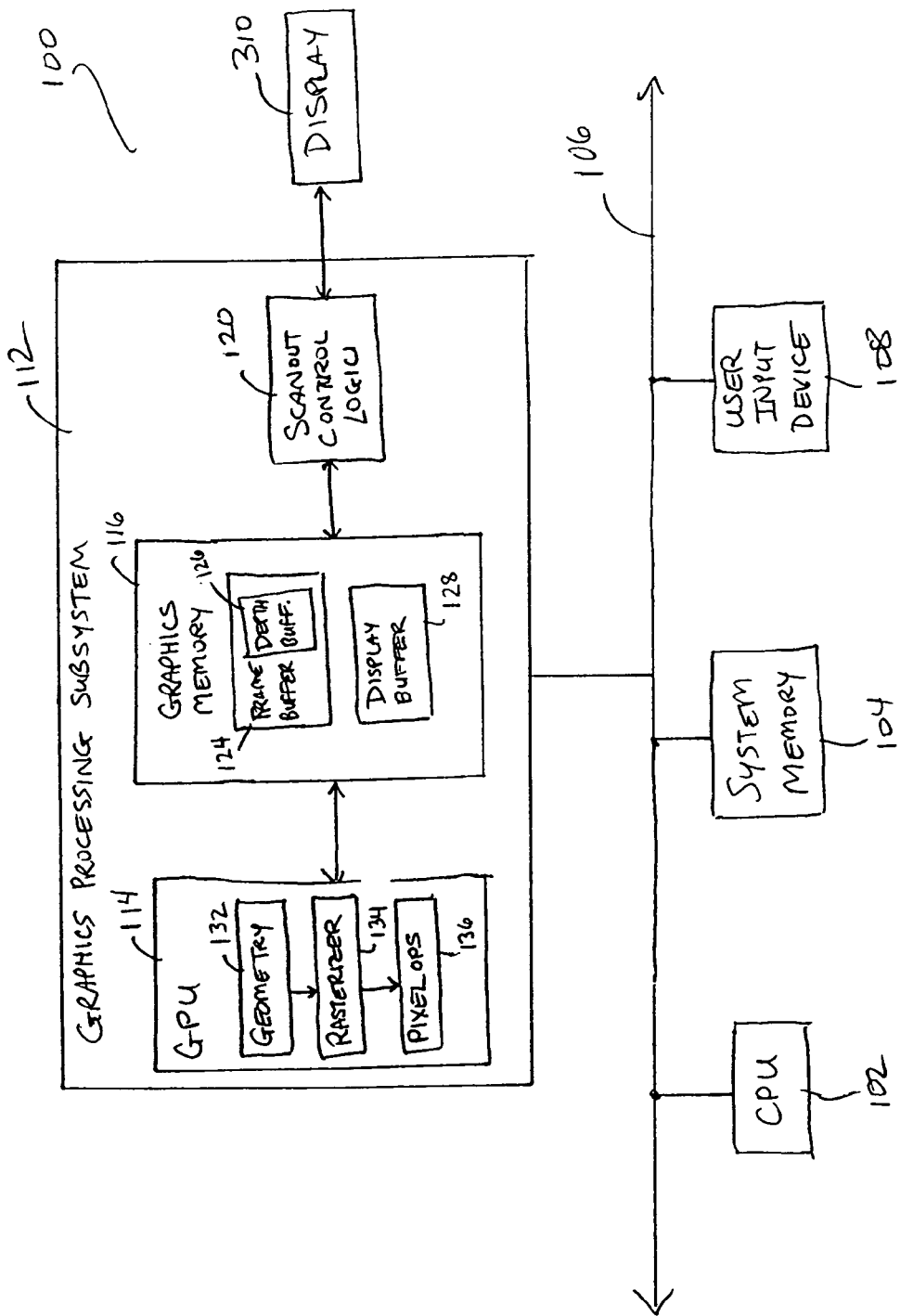
FIG. 1 is a block diagram of a computer system according to an embodiment of the present invention.

FIG. 1 is a block diagram of a computer system 100 suitable for implementing the present invention. Computer system 100 includes a central processing unit (CPU) 102 and a system memory 104 communicating via a system bus 106. User input is received from one or more user input devices 108 (e.g., keyboard, mouse) coupled to system bus 106. Visual output is provided on a display device 110 (e.g., a conventional CRT- or LCD-based monitor) operating under control of a graphics processing subsystem 112 coupled to system bus 106. Graphics processing subsystem 112 includes a graphics processing unit (GPU) 114, a graphics memory 116, and scanout control logic 120. Graphics memory 116 includes a frame buffer 124 that stores a shading value corresponding to each sample location for each pixel of an image. Frame buffer 124 advantageously includes a depth buffer 126 that stores a depth value for each sample location. Depth buffer 126 may be implemented using bit planes in a video memory device implementing frame buffer 124, a separate section within a memory device implementing frame buffer 126, or a separate memory device. A display buffer 128 stores a final color value for each pixel.

In operation, CPU 102 executes one or more application programs that generate geometry data, i.e., data describing components of an image to be rendered. The geometry data typically includes vertex coordinates, color information, and other information describing one or more primitives (e.g., triangles or other polygons) that make up the image. The geometry data may also define relationships among various primitives (e.g., a group of primitives may be identified as making up an object, such as a table, and the relationship of that object to other objects in the image may be specified), a view point and view direction for the image, boundaries of the viewable area, lighting parameters, and so on. Numerous techniques and formats for generating geometry data are known in the art, and any such techniques and formats may be used. The geometry data is provided via the system bus to the graphics processing subsystem.

GPU 114 includes a geometry unit 132 that receives the geometry data for an image to be rendered and performs various transformations on that data. Depending on implementation, these transformations may include lighting transforms, coordinate transforms to a viewing space defined by image plane (x,y) and depth (z) coordinates, culling of unseen primitives (e.g., back-facing primitives and/or primitives located entirely outside the viewable region), clipping of unseen portions of primitives, and the like. Any kind of transformation or other manipulation of the geometry data can be implemented; numerous examples are known in the art.

Geometry unit 132 provides transformed geometry data to a rasterizer 134. Rasterizer 134 converts the geometry data to pixel data, e.g., using scan-conversion and depth-buffering techniques. Rasterizer 134 is a multisampling rasterizer that can perform spatial and/or temporal multisampling, as will be described below, to generate shading and depth values for each pixel. Shading values are stored in frame buffer 124, and depth values are stored in depth buffer 126.

As will be described below, rasterizer 134 samples a primitive at a set of locations in a three-dimensional space defined by image plane coordinates (x,y) and a time coordinate t, thereby generating temporally multisampled pixel data. In some embodiments, an accumulation buffer (not shown) may also be provided in graphics memory 116 to accumulate data from multiple multisampling passes over a primitive, with accumulated results ultimately being provided to frame buffer 124.

After rasterization, a pixel operation unit 136 may perform additional operations on the pixel data. In accordance with an embodiment of the present invention, these operations can include texture mapping as well as downfiltering (i.e., blending of multiple shading sample values for a pixel) to produce a single shading value per pixel. Downfiltered pixel data is stored in display buffer 128.

Pixel data in display buffer 128 is read out by scanout control logic 120, which generates control signals for display device 110. In one embodiment, scanout control logic 120 reads the display buffer and refreshes the display at a constant rate (e.g., 70 Hz); the refresh rate can be a user-selectable parameter. Scanout control logic 120 may also perform various operations such as re-scaling of color values; generating composite screen images by combining the pixel data from display buffer 128 with data for a video or cursor overlay image or the like; digital-to-analog conversion; and so on.

It will be appreciated that FIG. 1 is illustrative and that modifications are possible. For instance, downfiltering can be performed during scanout by scanout control logic 120, in which case display buffer 128 is not used. Graphics memory 116 can be implemented using one or more memory devices. Frame buffer 124 and depth buffer 126 may be implemented as distinct memory devices or as logical or physical divisions within a single memory device. Any or all of the buffers can be implemented using double-buffering techniques, so that data for one frame of an image can be read while data for a subsequent frame is being written. The display device can be any pixel-based display, e.g., a CRT or LCD monitor, laser projection system, printer, etc. GPU 114 or its components can be implemented using one or more programmable processors programmed with appropriate software, application-specific integrated circuits (ASICs), other integrated circuit technologies, or any combination of these. In view of the present disclosure, persons of ordinary skill in the art will recognize that the present invention can be embodied in a wide variety of system configurations.

II. HYBRID SAMPLING EMBODIMENT

Embodiments of the present invention use an antialiasing technique called multisampling to provide both spatial and temporal antialiasing at lower computational cost than supersampling.

Figure 2:
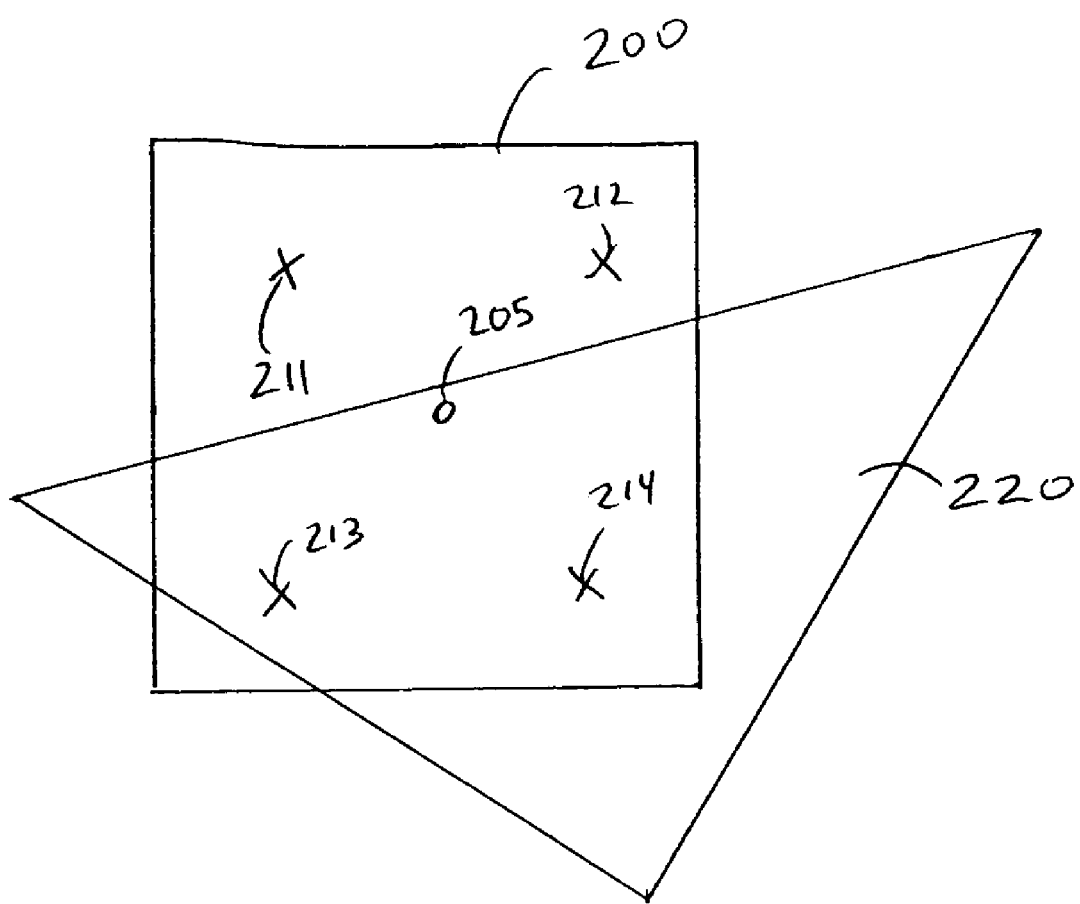
FIG. 2 is a two-dimensional view illustrating multisampling for a pixel.

Multisampling for spatial antialiasing is known in the art. FIG. 2 illustrates an example of multisampling for a pixel 200. Depth and coverage for pixel 200 are determined at each of a number of sample locations 211, 212, 213, 214. Shading is computed only once, at location 205. This shading value is stored for each sample location 211, 212, 213, 214 that is covered by the primitive. Subsequent primitives are rasterized as if the previous primitive had been supersampled. For example, when primitive 220 is rasterized, a shading value for pixel 200 is determined at location 205. Primitive 220 covers sample locations 213, 214, but not sample locations 211, 212. The shading value determined at location 205 is stored for sample locations 213, 214, but not for sample locations 211, 212. Upon downfiltering of the shading values for the four sample locations, pixel 200 has a color value that blends the respective colors of primitive 220 and its background. Because computing coverage and depth is generally less computationally intensive than computing shading, multisampling provides spatial antialiasing at reduced computational cost as compared to supersampling.

Figure 3:
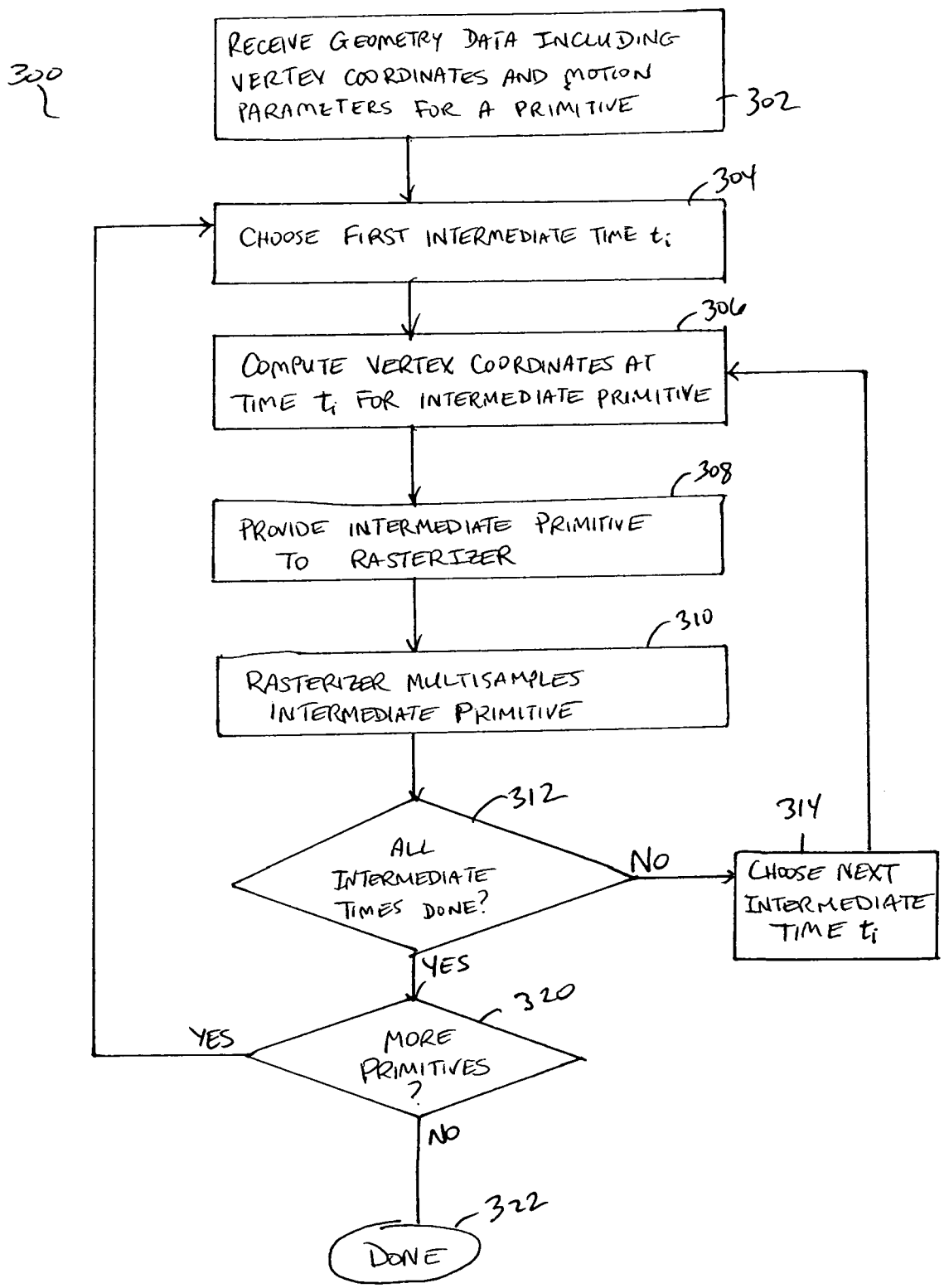
FIG. 3 is a flow chart of a process for temporal multisampling according to an embodiment of the present invention.

According to embodiments of the present invention, multisampling is used to provide temporal as well as spatial antialiasing. FIG. 3 is a flow chart of a process 300 for temporal multisampling according to one embodiment of the present invention. In process 300, intermediate vertex locations for a primitive are determined, thereby generating an intermediate primitive, and each of a number of intermediate primitives is multisampled.

More specifically, at step 302, geometry data, including vertex coordinates and motion parameters for a primitive, are received by GPU 114. The motion parameters may be provided in various forms, e.g., a second set of vertex coordinates representing vertex locations at the end of the frame, a velocity vector for the primitive, a velocity vector for each vertex, and so on. The primitive is advantageously processed by geometry unit 132 to transform it to image plane coordinates.

At step 304, a first intermediate time value $t_i$ is chosen. The intermediate time may be any time within the frame interval, including the beginning (denoted herein as $t=0$) and/or ending ($t=1$) times for the interval. At step 306, vertex locations for the intermediate primitive are computed using the value of $t_i$ and the motion parameters. Implementation of step 306 depends on the form of the motion parameters. For instance, if the initial location for a vertex is given by coordinates $(x_0, y_0)$ and the motion parameter is a final vertex location $(x_1, y_1)$, the intermediate vertex location at time $t_i$ is $(x_0(1-t_i)+x_1 t_i, y_0(1-t_i)+y_1 t_i)$. If the motion parameter is a velocity vector $(v_x, v_y)$, then the intermediate vertex location is $(x_0+v_x t_i, y_0+v_y t_i)$. Other motion parameters and computations may also be used.

At step 308, the intermediate primitive is provided to rasterizer 134, and at step 310, rasterizer 134 multisamples the intermediate primitive, using techniques such as that described above with reference to FIG. 2, and stores the results. In one embodiment, frame buffer 124 includes enough space to store a shading value for each three-dimensional sample location. In an alternative embodiment, the shading value for each covered sample location is written to an accumulation buffer, so that shading values at corresponding (x,y) sample positions for different times can be combined prior to storing in frame buffer 124.

At step 312, it is determined whether all the desired intermediate times $t_i$ have been processed. If not, at step 314, the next intermediate time $t_i$ is chosen and process 300 returns to step 306 to process the next intermediate primitive. If an accumulation buffer is used, shading values at corresponding (x,y) sample positions for each intermediate primitive are accumulated, optionally with unequal weighting factors. Accumulation of data for corresponding (x,y) sample positions in an accumulation buffer is well known in the art.

After all intermediate copies of the primitive have been generated and rasterized, process 300 determines whether more primitives remain (step 320). If so, process 300 returns to step 304 to process the next primitive. Where an accumulation buffer is used, the accumulated shading values for the primitive are transferred to frame buffer 124 at step 320 before proceeding to the next primitive. If all primitives have been processed, then process 300 is done (step 322). Graphics processing continues with subsequent operations, including filtering (or blending) of the shading values for each pixel to determine a pixel color value to be stored in display buffer 128.

It should be noted that process 300 is somewhat similar to "hybrid sampling" techniques for spatial anti-aliasing described in the above-referenced co-pending application Ser. No. 10/658,056. In this instance, however, different multisampling operations correspond to different times rather than different spatial locations.

Figure 4:
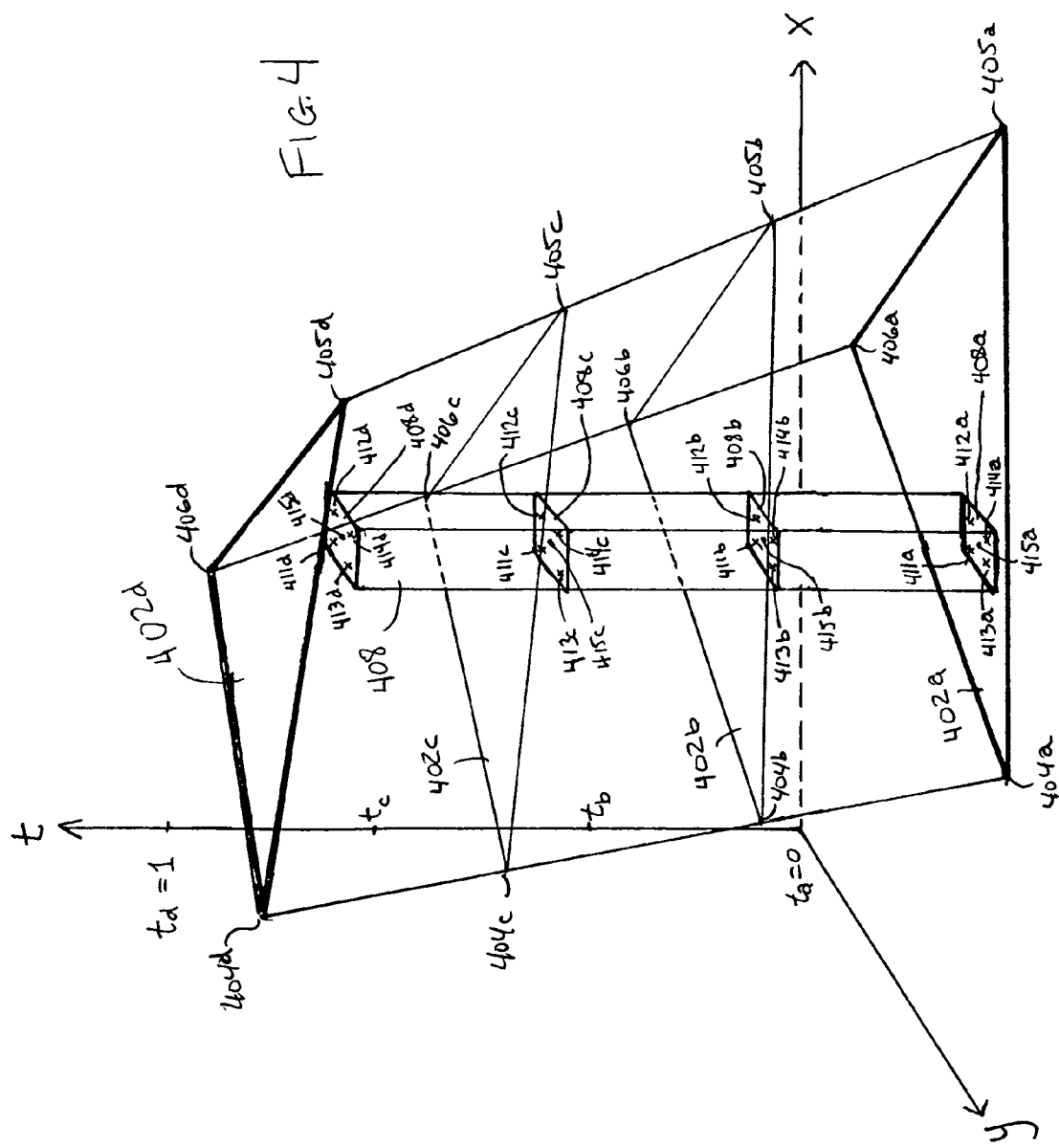
FIG. 4 is a three-dimensional view illustrating temporal multisampling in accordance with the process of FIG. 3.

FIG. 4 illustrates an application of process 300 for a pixel 408 that is partially covered by a moving primitive 402. Pixel 408 is shown as a volume in three dimensional (x,y,t) space, with t=0 corresponding to the beginning of the frame interval and t=1 corresponding to the end of the frame interval. Four intermediate sampling times $t_i$ are used, labeled as $t_a$, $t_b$, $t_c$, $t_d$, and pixels 408a, 408b, 408c, 408d correspond, respectively, to these intermediate times. In this example, $t_a$=0 and $t_d$=1, but that is not required.

For time $t_a$, an intermediate primitive 402a is generated, with vertices 404a, 405a, 406a (step 306 of process 300). Pixel 408a is multisampled by the rasterizer (step 310), which determines that sample locations 411a, 412a, 413a and 414a are all covered by primitive 402a. The rasterizer also computes one shading value for the pixel, at location 415a. This shading value is stored for the covered sample locations 411a, 412a, 413a, 414a.

Next, for time $t_b$, intermediate primitive 402b is generated, with vertices 404b, 405b, 406b (step 306). The motion of each vertex may be defined independently, so that the shape of the primitive can change during a frame interval. Pixel 408b is multisampled by the rasterizer (step 310), which determines that sample locations 411b and 412b are covered by primitive 402b, while sample locations 413b and 414b are not. The rasterizer also computes one shading value for the pixel, at location 415b. Because the vertices of primitive 402b have moved, the shading value at location 415b may be different from the shading value at location 415a. The shading value at location 415b is stored for the covered sample locations 411b, 412b, while the uncovered sample locations 413b, 414b retain a previously stored shading value.

In one embodiment, separate storage locations are used for each intermediate primitive. In an alternative embodiment, an accumulation buffer is used to accumulate shading values from different intermediate times for each spatial sample location; that is, the shading value for location 411b is blended with the shading value for location 411a, and the blended value is stored in the accumulation buffer. Accumulation buffers are known in the art, and a detailed description is omitted as not being crucial to understanding the present invention.

In a similar manner, intermediate primitives 402c and 402d are generated for times $t_c$ and $t_d$, respectively, and pixels 408c and 408d are multisampled. The results are either stored in separate storage locations or added to appropriate locations in an accumulation buffer. In either case, the final pixel color is a blend of shading values for the sixteen sample locations 411a-d, 412a-d, 413a-d, 414a-d. Thus, in this example, temporal and spatial antialiasing is achieved with only four shading computations per pixel (at locations 415a, 415b, 415c, 415d).

It will be appreciated that the process described herein is illustrative and that modifications and variations are possible. Steps described as sequential may be executed in parallel, order of steps may be varied, and steps may be modified or combined. Position and motion data for primitives may be provided in various forms, not limited to those described herein, and alternative techniques for computing intermediate vertex coordinates for a primitive may be used. The coverage sample locations are not limited to any particular number or arrangement. Any number of intermediate times may be used, and the intermediate times may be chosen as desired, including times corresponding to the start and/or end of a frame interval. Different intermediate times may be chosen for different frames or for different primitives in a frame, and shading values at different intermediate times may be given different weights in an accumulation buffer or subsequent downfiltering stage. In addition, use of an accumulation buffer is not required; blending of all samples may be performed after rasterization of the image is complete.

It should be noted that in some embodiments, vertices of a primitive have other attributes, such as shading and depth values, in addition to image-plane coordinates. To minimize computational costs, changes in these attributes during a frame interval may be ignored; for instance, primitives 402a, 402b, 402c, 402d may differ only in the locations of their vertices in the image plane. Motion of the vertex coordinates provides different shading values at each location 405a-d, which adds motion blur to the image. Alternatively, other vertex attributes may be allowed to vary in time. Any time-varying attributes are updated as part of generating an intermediate primitive, providing further improvements in realism at an increased computational cost.

III. VOLUMETRIC MULTISAMPLING EMBODIMENT

Figure 5:
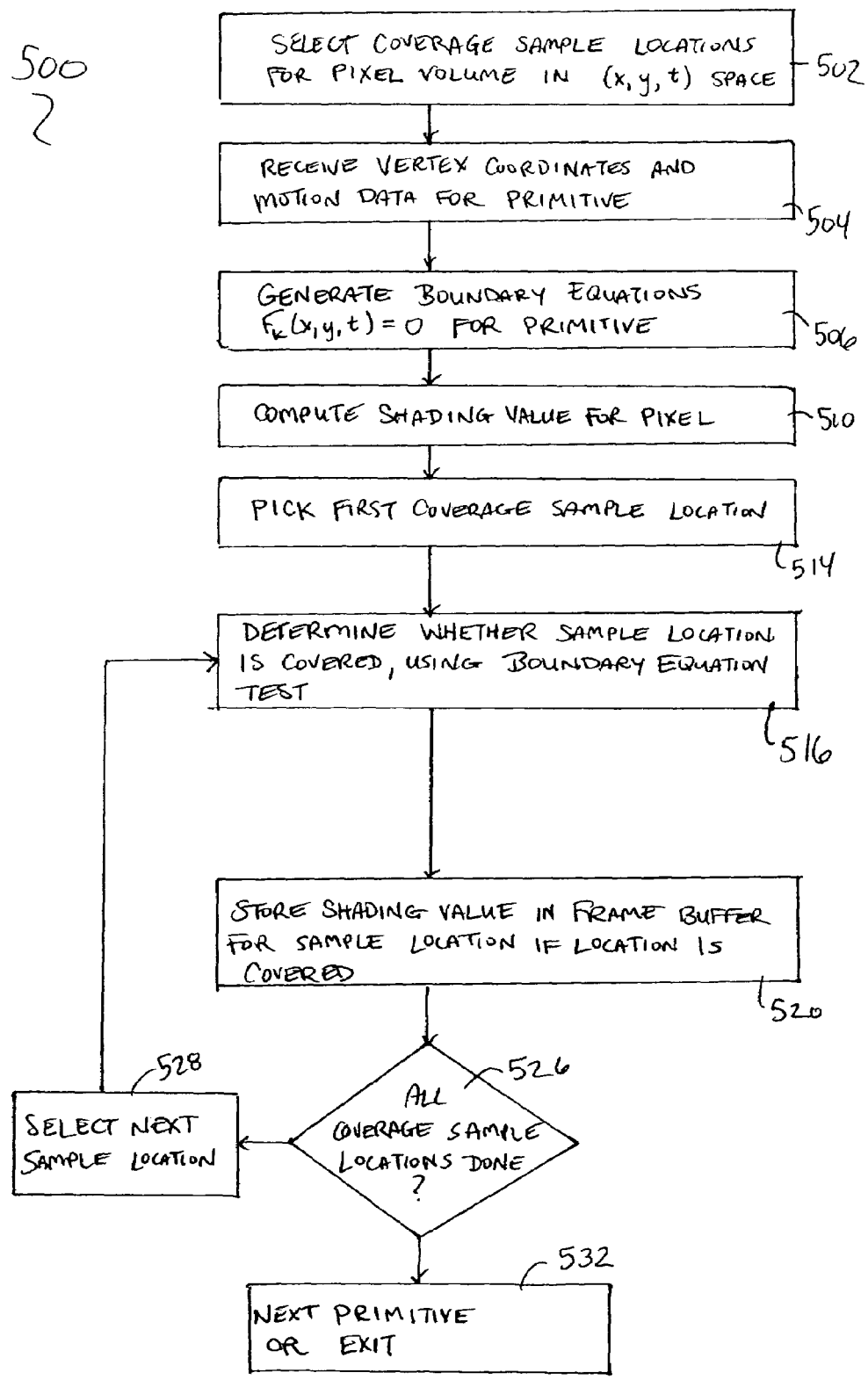
FIG. 5 is a flow chart of a process for temporal multisampling according to another embodiment of the present invention.

FIG. 5 is a flow chart of a process 500 for generating a temporally multisampled pixel according to another embodiment of the present invention. In process 500, a pixel volume in a three-dimensional (x,y,t) space-time is defined and muitisampled without requiring intermediate primitives to be generated. A boundary surface in the three-dimensional space-time that corresponds to the motion of each edge k of the primitive is defined according to a function $F_k(x,y,t)=0$, with $F_k>0$ indicating points "inside" the surface and $F_k<0$ indicating points "outside" the surface. Points that are inside boundary surfaces corresponding to all edges of the primitive are treated as being covered by the primitive; all other points are not.

More specifically, at step 502, a set of N coverage/depth sample locations $(x_i, y_i, t_i)$, i=1, 2, ..., N is selected for a pixel. The sample locations are advantageously located within a volume defined by the pixel boundaries in the image plane and the frame-bounding planes t=0 and t=1, and may be distributed in that volume in any desired manner. Different sampling patterns can be selected for different pixels or different frames, as desired.

At step 504, vertex coordinates and motion data for the primitive are received. At step 506, the data is used to generate a set of boundary equations for the primitive. The boundary equations approximate the motion of the edges of the primitive and can be defined to any desired degree of accuracy. For instance, in one embodiment, motion other than translation of the primitive can be ignored. In that case, the motion of each edge k defines a plane in (x,y,t) space, and the boundary equation for edge k can be of the form:

$$F_k(x,y,t)=A_k x+B_k y+C_k t+D_k=0, \quad (1)$$

where $A_k$, $B_k$, $C_k$, and $D_k$ are constants that can be computed using conventional techniques for evaluating plane equation coefficients.

In another embodiment, each vertex moves from an initial location to a final location. For each edge k, an initial edge equation of the form $A_{0k}x+B_{0k}y+C_{0k}=0$ can be determined from the initial vertex locations using conventional techniques, and a final edge equation of the form $A_{1k}x+B_{0k}y+C_{1k}=0$ can be determined from the final vertex locations using conventional techniques. A time-dependent boundary equation for edge k is generated using bilinear interpolation between the initial and final edge equations. In this embodiment, the boundary equation for edge k has the form:

$$F_k(x,y,t)=[A_{0k}(1-t)+A_{1k}t]x+[B_{0k}(1-t)+B_{1k}t]y+[C_{0k}(1-t)+C_{1k}t]=0 \quad (2)$$

Other forms for the boundary equations may also be used. In other embodiments, higher-order equations may be used to define boundary surfaces of arbitrary shape.

At step 510, a shading value is computed for the pixel. In one embodiment, the shading value may be computed by selecting a location (x,y) within the pixel and computing the shading for that location at a fixed time (e.g., t=0 or t=½), as is done in conventional multisampling processes. The use of a single shading computation, however, may lead to undesirable artifacts. Alternative embodiments that reduce these artifacts will be described below.

At step 514, the first of the N coverage sample locations identified in step 502 is selected, and at step 516, coverage for that location is determined using a test based on the boundary equations that were computed at step 506. For each edge k, the coordinates $(x_i,y_i,t_i)$ of the current sampling location are used to determine whether $F_k(x_i,y_i,t_i)>0$. If the inequality holds for every edge k of the primitive, the sample location is inside the primitive; otherwise, it is outside.

At step 520, based on the results of coverage testing and depth testing, the frame buffer is updated using the shading value computed at step 510. That is, the shading value for the pixel is stored for the coverage sample location if the location is covered by the primitive and if the primitive is not known to be obscured by another object or primitive. The depth value is also stored.

At step 526, it is determined whether all sample locations have been processed for the pixel. If not, at step 528 the next coverage sample location $(x_i,y_i,t_i)$ is selected, and the process returns to step 516. If all sample locations have been processed, then at step 532, process 500 proceeds to the next primitive; if all primitives have been processed, process 500 exits. Graphics processing continues with subsequent operations, including filtering (or blending) of the shading values for each pixel to determine a pixel color value to be stored in display buffer 128.

Figure 6:
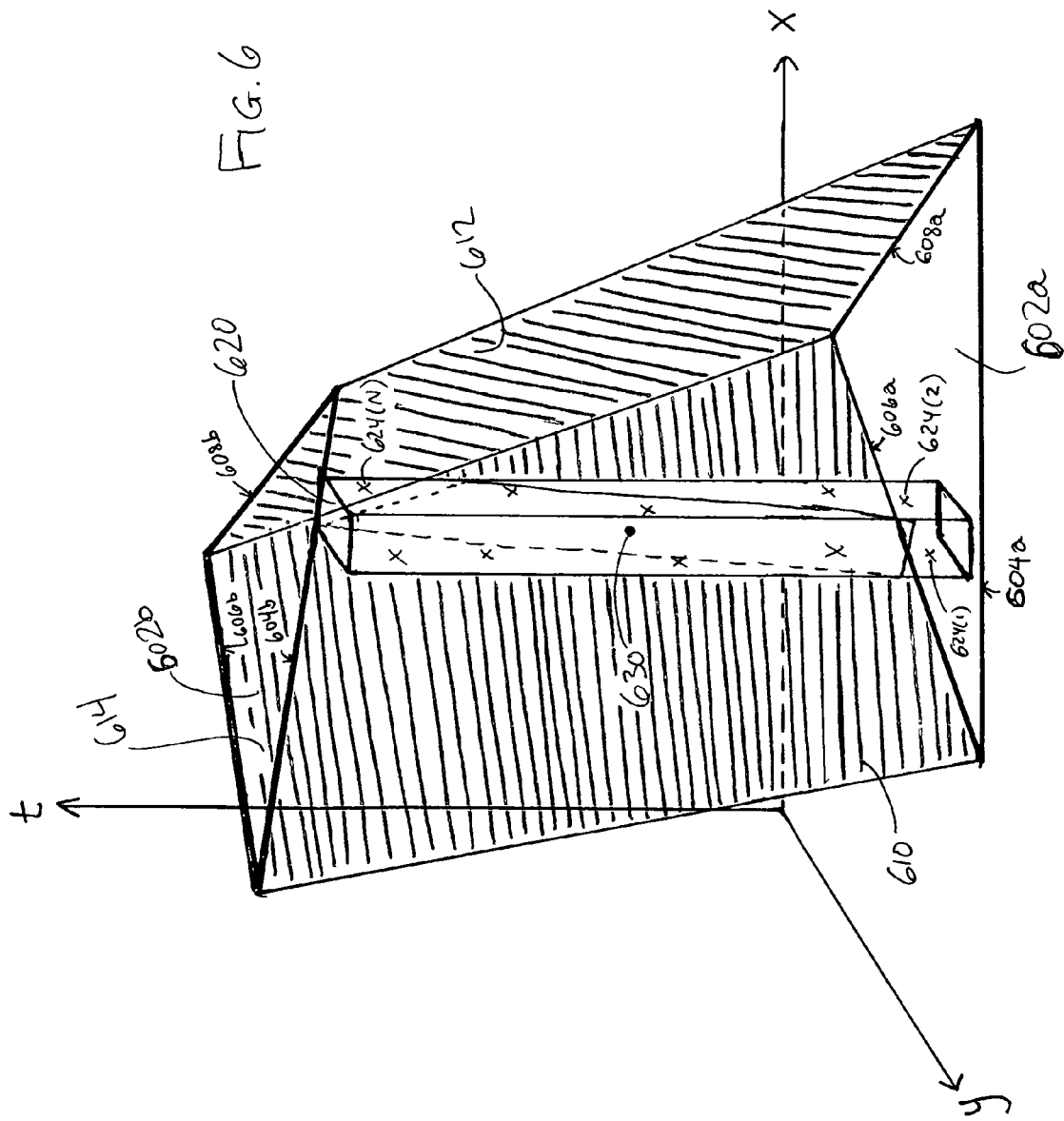
FIG. 6 is a three-dimensional view illustrating temporal multisampling in accordance with the process of FIG. 5.

FIG. 6 illustrates an application of process 500 for a pixel that is partially covered by a moving primitive. Pixel 620 is shown as a volume in three dimensional (x,y,t) space-time, with t=0 corresponding to the beginning of the frame interval and t=1 corresponding to the end of the frame interval. Sampling locations 624(1), 624(2), . . . , 624(N), selected at step 502, are each marked by an "X". A primitive 602*a* at t=0 and a corresponding primitive 602*b* at t=1 are shown. As the primitive moves, it traces out a volume in the three-dimensional space-time, bounded by surfaces 610, 612 (vertical hatching), 614 (horizontal hatching), which need not be planar.

In accordance with one embodiment of process 500, initial (t=0) edge equations for edges 604*a*, 606*a*, 608*a* are computed, as are final (t=1) edge equations for edges 604*b*, 606*b*, 608*b*. From these equations, three boundary equations $F_0(x,y,t)=0$; $F_1(x,y,t)=0$; $F_2(x,y,t)=0$—which approximate surfaces 610, 612, 614, respectively—are computed using bilinear interpolation as described above. Other techniques for determining boundary equations may also be used. Shading is computed at a location 630, and the shading value is stored for each sample location 624(1), 624(2), . . . , 624(N) that satisfies the coverage inequalities $F_0(x,y,t)>0$; $F_1(x,y,t)>0$; $F_2(x,y,t)>0$.

It will be appreciated that the process described herein is illustrative and that variations and modifications are possible. Steps described as sequential may be executed in parallel, order of steps may be varied, and steps may be modified or combined. The form of the boundary equations is not limited to the examples described herein, and equations of arbitrary complexity may be used. In addition to the linear and bilinear examples described herein, boundary equations of any order (e.g., quadratic, cubic, etc.) may be used. Depth testing is not required; ordering of primitives may be determined using various other techniques, numerous examples of which are known in the art.

Those of skill in the art will appreciate that the use of a bounding surface $F_k(x,y,t)=0$ for coverage determination extends the two-dimensional edge equations $(A_kx+B_ky+C_k=0)$ that are conventionally used for coverage determination to three dimensions. In accordance with the present invention, the three-dimensional bounding surfaces are not limited to planes, and any bounding function can be chosen, not limited to the examples described above. As with conventional two-dimensional edge equations, the boundary surface equations can be used to determine whether a sample location that has known coordinates $(x_i,y_i,t_i)$ is covered by the primitive. But in this case, coverage depends on time as well as location, so that motion of the primitive affects the rendered image, thereby providing temporal antialiasing.

Further options for computing the shading value for a temporally multisampled pixel will now be described. As described above, a shading value can be computed using a single (x,y,t) location. While this technique can make the primitive partially transparent due to changes in coverage as a function of time, it does not actually blur the primitive; as a result, ghost images and other artifacts may appear.

Figure 7:
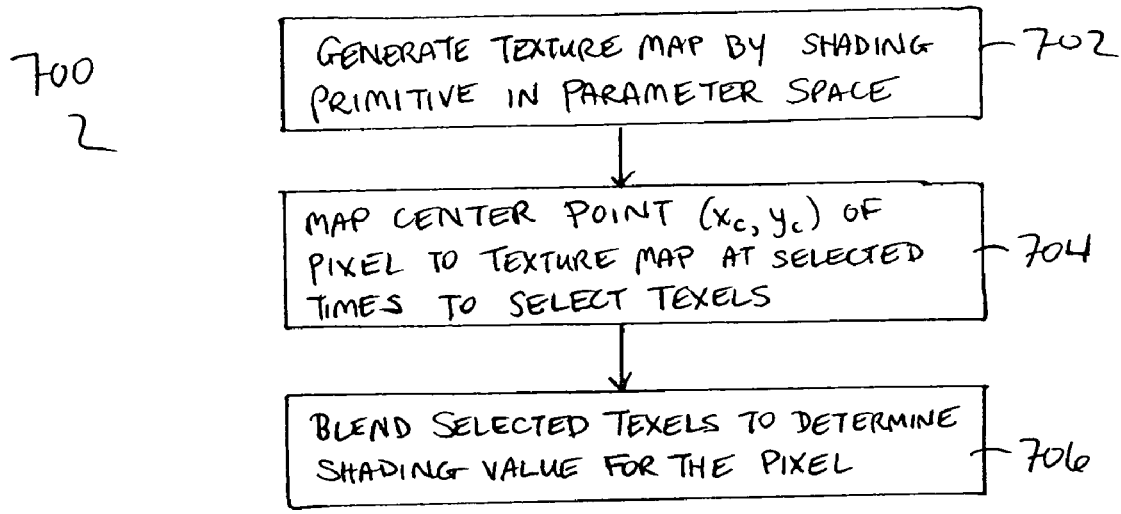
FIG. 7 is a flow chart of a process for generating shading values according to an embodiment of the invention.

One alternative embodiment uses anisotropic filtering techniques to generate a blended (or blurred) shading value for the pixel, thereby reducing such artifacts. FIG. 7 is a flow chart of a process 700 for generating shading values by anisotropic filtering according to an embodiment of the invention. In process 700, the primitive is processed twice. In a first processing pass, a texture map is generated by shading the primitive in parameter space (step 702); conventional texture-map generation techniques may be used. In this step, motion of the primitive is ignored.

At step 704, during a second processing pass, the spatial center point $(x_c,y_c)$ of the pixel is mapped onto the texture map at a number of different times $t_1, t_2, \ldots, t_M$, which need not correspond to any of the times of the N coverage samples. That is, a texel of the texture map from step 702 corresponding to $(x_c,y_c,t_1)$ is selected; a texel corresponding to $(x_c,y_c,t_2)$ is selected, and so on. In one embodiment, a velocity vector can be generated for a pixel representing its motion across the texture map. This vector can be used to define a line of anisotropy along which texels should be filtered using an appropriate filter function.

Figure 8:
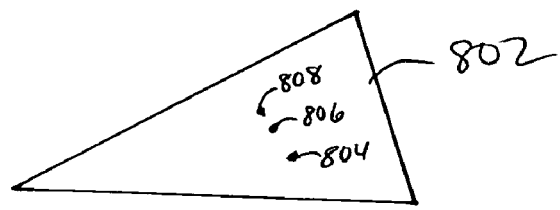
FIG. 8 is a two-dimensional view illustrating selection of texture map locations in accordance with the process of FIG. 7.

FIG. 8 illustrates this principle. A primitive 802 in the (x,y) plane is shown. Texel 804 corresponds to coordinates $(x_c,y_c,t_1)$; texel 806 corresponds to coordinates $(x_c,y_c,t_2)$; and texel 808 corresponds to coordinate $(x_c,y_c,t_3)$. Because the primitive is in motion, the different sample times map to different texels. The distribution of samples depends on the motion of the primitive and is not required to be isotropic, nor is it required that each sample time maps to a different texel.

At step 706, the M texels selected in step 704 are blended to arrive at a shading value. Blending can be done by averaging, weighted averaging, or other techniques. This shading value is then stored for each of the N coverage sample locations that is covered by the primitive. The number of texture mapping points (M) need not be equal to the number of coverage sample locations (N).

It will be appreciated that the process described herein is illustrative and that variations and modifications are possible. Steps described as sequential may be executed in parallel, order of steps may be varied, and steps may be modified or combined. The center point of the pixel need not be used; a different reference point (i.e., set of image plane coordinates) may be selected instead, and the reference point is not required to be inside the pixel boundaries.

In an alternative embodiment, a shading value is determined for a micropolygon derived from the primitive and associated with the pixel. For example, the scene being rendered can be tessellated (decomposed into primitives) in such a way that each primitive covers no more than one pixel (or sample) in the final image. In such cases, one shading value per primitive can be determined.

IV. RENDERING BACK-FACING PRIMITIVES

In some embodiments of the invention, a primitive may undergo a "face flip" during a frame interval. As is generally known in the art, primitives may be "front-facing" (i.e., oriented toward the viewpoint) or "back-facing" (i.e., oriented away from the viewpoint). In many applications, although not in all, back-facing primitives are ignored. A face flip occurs when a primitive that was front-facing at the beginning of the frame becomes back-facing at the end of the frame (or vice versa) due to the motion of its vertices. It is advantageous to allow coverage computations to take such face flips into account, in a manner that depends on whether back-facing primitives are to be ignored.

Figure 9A:
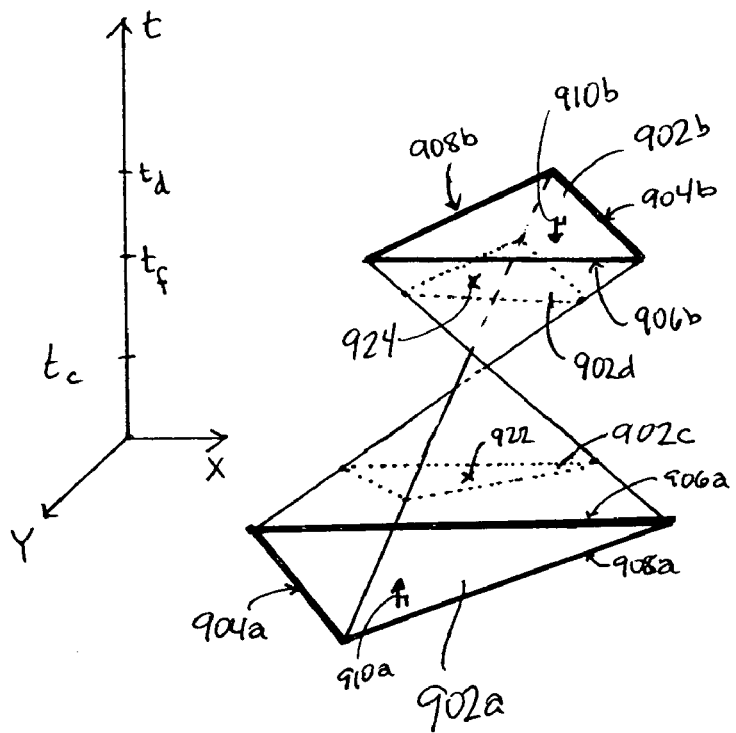
FIG. 9A is a three-dimensional view illustrating a primitive undergoing a face flip.

FIG. 9A illustrates a three-dimensional (x,y,t) view of a primitive undergoing a face flip. At time t=0, a primitive 902a has edges 904a, 906a, 908a, and a surface normal 910a that points upward (i.e., out of the image plane), indicating that primitive 902a is front facing. At time t=1, primitive 902a has become primitive 902b, which has edges 904b, 906b, 908b, and a surface normal 910b that points downward (i.e., into the image plane), indicating that primitive 902b is back facing. Sample locations 922 (at t=$t_c$) and 924 (at t=$t_d$) are shown for a pixel (the pixel boundaries are not shown).

Figure 9B:
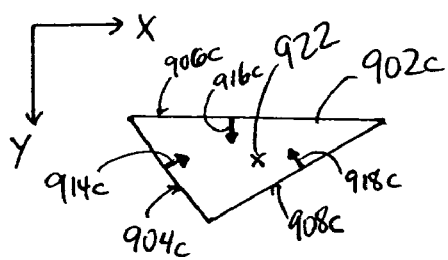
FIGS. 9B-C are two-dimensional views illustrating the primitive of FIG. 9A at different times.

FIG. 9B illustrates a two-dimensional (x,y) view of the primitive 902c at the first intermediate time $t_c$. At time $t_c$, primitive 902c has edges 904c, 906c, 908c that satisfy boundary equations of the form $F_k(x,y,t_c)=0$. Each boundary equation defines an "inside" as indicated by arrows 914c, 916c, 918c. Sample point 922 is inside each boundary and therefore is covered by the primitive 902c.

Figure 9C:
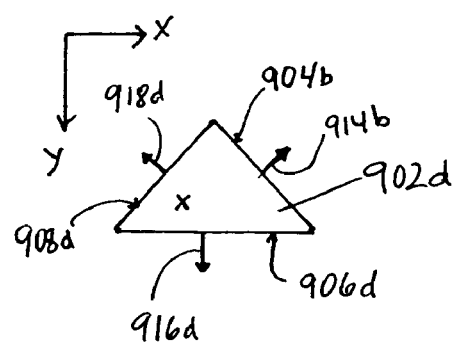

FIG. 9C illustrates a two-dimensional view of the primitive 902d at the second intermediate time $t_d$. At this time, primitive 902d has edges 904d, 906d, 908d that satisfy boundary equations of the form $F_k(x,y,t_d)=0$. Each boundary equation defines an "inside" indicated by arrows 914d, 916d, 918d. Sample point 924 is outside each boundary and therefore is not covered by the primitive 902d. In fact, as arrows 914d, 916d, 918d indicate, there are no points (x,y,$t_d$) that are inside all of the boundaries; thus, primitive 902d covers no points. If back-facing primitives are not to be rendered, the boundary surface technique described above automatically produces a correct result: the primitive is invisible during portions of frames when the primitive is back-facing because no points satisfy the coverage test.

Back-facing primitives may be rendered, if desired, by making the inequality used to determine coverage dependent on time. In one embodiment, a "crossover time" $t_f$ is defined, and a sampling location is defined to be inside a boundary surface $F_k(x,y,t)=0$ if:

$$\begin{cases} F(x,y,t) > 0, t < t_f \\ F(x,y,t) < 0, t > t_f \end{cases} \quad (3)$$

for a primitive that is front-facing at t=0 and back-facing at t=1. For a primitive that is back-facing at the beginning of a frame and front-facing at the end, the inequalities are reversed.

As an example, a crossover time $t_f$ is indicated in FIG. 9A, and time $t_d$ is after the crossover time $t_f$. With "inside" and "outside" defined using the above time-dependent inequality (3), the arrows 914d, 916d, 918d in FIG. 9C now indicate the outside of each edge 904d, 906d, 908d, rather than inside, and sample location 922 is determined to be covered by primitive 902d.

The crossover time $t_f$ can be determined in various ways. In one embodiment, the crossover time is determined by interpolating between "facedness" values computed for the beginning and end of the frame interval. As used herein, the term "facedness" refers to a signed number proportional to the area of a primitive, with positive values corresponding to front-facing primitives and negative values corresponding to back-facing primitives (or vice versa; the definition is a matter of convention). Various techniques can be used to compute facedness. For instance, if the primitive is a P-sided polygon having an ordered list of vertices, facedness can be computed from the vertex coordinates ($x_j,y_j$), where subscript j denotes the position in the ordered list, using the formula:

$$\text{Facedness} = \frac{1}{2}\sum_{j=0}^{P-1} x_i y_{i\oplus 1} - x_{i\oplus 1} y_i, \quad (4)$$

where i⊕1 denotes (i+1) mod P. In this instance, if the ordered list of vertices progresses clockwise around the primitive, the primitive is back-facing.

Initial and final values of facedness are compared to determine whether the sign has changed, i.e., whether a face flip has occurred. If the sign has changed, then linear interpolation between the initial and final facedness values is used to determine a time at which the facedness is zero, corresponding to the primitive being edge-on in the image plane. This time is used as the crossover time $t_f$.

V. EXTENSION TO ADDITIONAL DIMENSIONS

The multidimensional multisampling techniques described herein are not restricted to temporal multisampling. In view of the present disclosure, persons of ordinary skill in the art will recognize that boundary equations can be extended to any number of dimensions, not just the three dimensions (x,y,t) described above, and that the extra dimensions may correspond to any property of the image that it is desired to smooth. Accordingly, as used herein, terms such as "space" and "volume" are to be understood as including generalized hyperspaces and hyper-volumes of D dimensions for any integer D≧3, and terms such as "plane" and "surface" are to be understood as including hyper-planes and hyper-surfaces of dimension D−1 in a D-dimensional space.

VI. APPLICATION PROGRAM INTERFACE (API)

The embodiments of the invention described above provide temporal multisampling of pixel data within the graphics driver and/or graphics processing subsystem, thereby making temporal multisampling largely transparent to the application. To enable temporal multisampling, applications provide data indicating the motion of a primitive, as described above, but applications are not required to specify multisampling parameters, generate intermediate primitives, or otherwise control the temporal multisampling process.

In some embodiments, an application program interface (API) can be provided in the graphics driver, thereby enabling applications to exert control over various features and options of the temporal multisampling process. As is generally known, an API provides a set of function calls that an application programmer can invoke in order to interact with various features of a platform on which the application is running, e.g., by adjusting graphics processing parameters to optimize the application's performance. In an embodiment of the present invention, the API of the graphics driver can include function calls that enable or disable temporal multisampling, select the number of sample locations and/or time points to use, select a sampling pattern to be used by the rasterizer, select among options for computing a shading value to be shared among sample locations for a pixel, and so on. In addition, as described above, multidimensional multisampling can be used for any number of dimensions corresponding to various properties of an image, such as motion and/or shadowing. The API can include function calls to select the dimensions and/or properties to be multisampled.

Providing an API is not required, but allowing developers to control trade offs between rendering speed and image quality increases flexibility of the system and the ability to deliver optimum performance for a variety of applications.

VII. FURTHER EMBODIMENTS

As described above, embodiments of the present invention provide spatial as well as temporal antialiasing via multisampling processes that require fewer shading computations per pixel than conventional temporal supersampling processes. Multisampling can also be extended to one or more other dimensions in addition to (or instead of) time, to provide other desirable effects such as soft-edged shadows, depth of field, and the like.

While the invention has been described with respect to specific embodiments, one skilled in the art will recognize that numerous modifications are possible. For instance, the invention is not limited to a particular multisampling pattern or number of samples per pixel. Shading can be computed in various ways, so long as shading values are shared among a number of sample locations for a pixel. Any number of dimensions corresponding to any combination of rendering parameters and/or image properties may be used; the invention is not limited to time and shadows. The techniques described herein can be implemented using special-purpose hardware, programmable processors executing appropriate software, and any combination of hardware and/or software components.

Thus, although the invention has been described with respect to specific embodiments, it will be appreciated that the invention is intended to cover all modifications and equivalents within the scope of the following claims.

What is claimed is:

1. A method for generating a multisampled pixel in a multi-dimensional space, the method comprising:
(a) receiving geometry data representing a primitive in the multi-dimensional space, wherein the multi-dimensional space includes two dimensions corresponding to an image plane, and wherein the multi-dimensional space further includes a time dimension, the time dimension extending between a starting time of a frame and an ending time of a frame;
(b) generating a set of boundary equations from the geometry data, the boundary equations representing boundary surfaces of the primitive in the multi-dimensional space;
(c) selecting a plurality of coverage sample points within a pixel volume in the multi-dimensional space;
(d) computing a single shading value for the pixel using the primitive; and
(e) for each of the plurality of coverage sample points:
(i) determining from the set of boundary equations whether the coverage sample point is inside the primitive, wherein determining whether the coverage sample point is inside of the primitive further comprises:
(1) computing a starting facedness value for the primitive at the starting time of the frame and an ending facedness value for the primitive at the ending time of the frame from the geometry data;
(2) comparing the starting and ending facedness values to detect a change in facedness; and
(3) in response to detecting a change in facedness:
interpolating between the starting and ending facedness values to identify a crossover time; and
during the act of determining whether the coverage sample point is inside the primitive, applying a test that depends on whether a time coordinate of the coverage sample point is before or after the crossover time; and
(ii) in response to determining that the coverage sample point is inside the primitive, storing the single shading value for the coverage sample point.

2. The method of claim 1, further comprising:
repeating acts (a)-(e) for at least one additional primitive; and
(f) filtering the stored shading values for the coverage sample points to generate a pixel color value.

3. The method of claim 1 wherein the act of generating the set of boundary equations includes:
computing a first edge equation from the geometry data, the first edge equation representing an edge of the primitive at the starting time of the frame;
computing a second edge equation from the geometry data, the second edge equation representing the edge of the primitive at the ending time of the frame; and
using respective coefficients of the first edge equation and the second edge equation to generate a boundary equation representing a boundary surface in the multi-dimensional space.

4. The method of claim 3, wherein the boundary equation is a plane equation.

5. The method of claim 3, wherein the boundary equation is a bilinear equation.

6. The method of claim 1 wherein the act of generating the set of boundary equations includes generating a planar boundary equation from the geometry data.

7. The method of claim 1 wherein the act of computing the single shading value for the pixel includes computing the shading value at a single shading point within the pixel volume.

8. The method of claim 1 wherein the act of computing the shading value for the pixel includes:
generating a texture map by shading the primitive in parameter space;
selecting a plurality of sampling times;
mapping a reference point of the pixel to a location in the texture map at each of the sampling times, thereby generating a plurality of texture values; and
computing the shading value for the pixel by blending the texture values.

9. The method of claim 8 wherein the reference point corresponds to a center point of the pixel in the image plane.

10. The method of claim 8 wherein the act of generating the texture map is performed during a first processing pass and the act of determining whether the sample location is inside the primitive is performed during a second processing pass.

11. The method of claim 1 wherein the act of computing the shading value for the pixel includes computing a shading value for a micropolygon associated with the pixel.

12. A system for generating a color value for a pixel from geometry data, the system comprising:
  a graphics processor having a rasterizer configured to generate a single shading value for the pixel from each of a plurality of primitives included in the geometry data and to determine coverage for each of the plurality of primitives at each of a plurality of sample locations for the pixel in a multi-dimensional space having at least three dimensions, wherein the multi-dimensional space includes two dimensions corresponding to position in an image plane, and wherein the multi-dimensional space further includes a time dimension, the time dimension extending between a starting time of a frame and an ending time of a frame, wherein the graphics processor is further configured to:
    compute a starting facedness value for the primitive at the starting time of the frame and an ending facedness value for the primitive at the ending time of the frame from the geometry data;
    compare the starting and ending facedness values to detect a change in facedness; and
    in response to detecting a change in facedness:
      interpolate between the starting and ending facedness values to identify a crossover time; and
      during the act of determining whether the coverage sample point is inside the primitive apply a test that depends on whether a time coordinate of the coverage sample point is before or after the crossover time;
  a memory configured to store the single shading value from one of the primitive in association with each of the plurality of sample locations that is determined to be covered by that one of the primitives; and
  a shader configured to combine the stored shading values across the plurality of sample locations, thereby computing the color value for the pixel.

13. The system of claim 12 wherein the coverage sample generator determines coverage based on a set of boundary equations in the multi-dimensional space, the boundary equations being determined from the geometry data.

14. The system of claim 13 wherein the multi-dimensional space includes a space dimension and a time dimension, and wherein each of the set of boundary equation is bilinear in the space dimension and the time dimensions.

15. The system of claim 13 wherein each of the set of boundary equations is planar.

16. The system of claim 12 wherein the rasterizer is further configured to compute a shading value at a single shading point within a pixel volume in the multi-dimensional space.

17. The system of claim 12 wherein the rasterizer is further configured to compute a shading value from a texture map generated from the primitive.

18. The system of claim 17 wherein the shading value is computed by mapping each of a plurality of reference points in the pixel volume to the texture map.

19. The system of claim 12, further comprising:
  a graphics driver module configured to communicate with the graphics processor, wherein the graphics driver module provides an application program interface for controlling a parameter of operation of the rasterizer.

20. A system for generating a color value for a pixel from geometry data, the system comprising:
  a geometry unit configured to generate a plurality of intermediate primitives corresponding to a primitive of the geometry data, each intermediate primitive corresponding to a respective intermediate time within a frame interval, wherein the geometry unit is further configured to;
    compute a starting facedness value for the primitive at the starting time of the frame and an ending facedness value for the primitive at the ending time of the frame from the geometry data;
    compare the starting and ending facedness values to detect a change in facedness;
    in response to detecting a change in facedness, interpolate between the starting and ending facedness values to identify a crossover time; and
  a rasterizer configured to perform a multisampling operation for each intermediate primitive, wherein each multisampling operation generates a single shading value for the pixel, determines whether each of a plurality of coverage sample locations for the pixel is covered by the intermediate primitive, and associates the single shading value with each one of the plurality of coverage sample locations that is determined to be covered by the intermediate primitive, wherein if a change in facedness is detected, the rasterizer is configured to multisample intermediate primitives having an intermediate time that is before the crossover time if the facedness of the primitive changes from front-facing to back-facing at the crossover time or having an intermediate time that is after the crossover time if the facedness of the primitive changes from back-facing to front-facing at the crossover time; and
  a shader configured to combine the shading values associated with the coverage sample locations for the pixel, thereby computing the color value for the pixel.

21. The system of claim 20 wherein the geometry unit is further configured to generate the intermediate primitives by linearly interpolating between a starting location and an ending location of a vertex of the primitive.

22. The system of claim 20 wherein the geometry unit is further configured to generate the intermediate primitives using a bilinear equation obtained by interpolating between corresponding coefficients of initial and final equations for an edge of the primitive.

23. The system of claim 20 wherein the geometry unit is further configured to generate the intermediate primitives using a plane equation representing the location of an edge of a primitive as a function of time, the plane equation obtained from respective starting locations of two of the plurality of vertices and a velocity vector for the primitive.

* * * * *